(12) United States Patent
Moshchuk et al.

(10) Patent No.: US 10,974,758 B2
(45) Date of Patent: Apr. 13, 2021

(54) METHOD AND APPARATUS THAT DIRECT LATERAL CONTROL DURING BACKWARD MOTION

(71) Applicant: GM GLOBAL TECHNOLOGY OPERATIONS LLC, Detroit, MI (US)

(72) Inventors: Nikolai K. Moshchuk, Grosse Pointe, MI (US); Kausalya Singuru, Troy, MI (US); David Andrés Pérez Chaparro, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 16/194,709

(22) Filed: Nov. 19, 2018

(65) Prior Publication Data

US 2020/0156694 A1    May 21, 2020

(51) Int. Cl.

| | |
|---|---|
| *B62D 1/28* | (2006.01) |
| *B60W 10/20* | (2006.01) |
| *B60W 30/18* | (2012.01) |
| *G05D 1/02* | (2020.01) |
| *B62D 6/00* | (2006.01) |
| *G05D 1/00* | (2006.01) |

(52) U.S. Cl.
CPC ............ *B62D 1/28* (2013.01); *B60W 10/20* (2013.01); *B60W 30/18036* (2013.01); *B62D 6/002* (2013.01); *G05D 1/0088* (2013.01); *G05D 1/0212* (2013.01); *G05D 1/0231* (2013.01); *B60W 2420/52* (2013.01); *B60W 2420/62* (2013.01); *B60W 2710/207* (2013.01)

(58) Field of Classification Search
CPC ............ B60W 10/20; B60W 2420/52; B60W 2420/62; B60W 2710/207; B60W 30/18036; B62D 15/0285; B62D 1/28; B62D 6/002; G05D 1/0088; G05D 1/0212; G05D 1/0231
See application file for complete search history.

(56) References Cited

U.S. PATENT DOCUMENTS

| | | | | |
|---|---|---|---|---|
| 8,199,987 | B2* | 6/2012 | Caryer Cook | G06K 9/00 382/128 |
| 2005/0049766 | A1 | 3/2005 | Tanaka et al. | |
| 2005/0273236 | A1 | 12/2005 | Mori et al. | |
| 2009/0279774 | A1* | 11/2009 | Cook | G06K 9/00 382/141 |
| 2012/0185113 | A1* | 7/2012 | Pampus | B60W 30/06 701/1 |
| 2014/0365108 | A1* | 12/2014 | You | B62D 15/0285 701/408 |

(Continued)

*Primary Examiner* — Tyler J Lee
(74) *Attorney, Agent, or Firm* — Quinn IP Law

(57) ABSTRACT

A method and apparatus that control lateral movement of the vehicle during backward motion are provided. The method includes loading a desired backward path of vehicle, the backward path comprising waypoints to be traveled along during a rearward motion of the vehicle, reflecting the waypoints along a reflection axis perpendicular to a longitudinal axis that runs from front to back of the vehicle such that the reflected waypoints define virtual forward path; and controlling lateral movement of the vehicle to follow the waypoints along the forward path while the vehicle is traveling in a backward direction.

18 Claims, 2 Drawing Sheets

(56) References Cited

U.S. PATENT DOCUMENTS

| | | | |
|---|---|---|---|
| 2016/0153791 A1* | 6/2016 | Deittert | G01C 21/20 |
| | | | 701/25 |
| 2017/0233001 A1 | 8/2017 | Moshchuk et al. | |
| 2018/0297589 A1* | 10/2018 | Hasejima | B60R 21/00 |
| 2019/0101925 A1* | 4/2019 | Simmons | G05D 1/0231 |
| 2020/0122717 A1* | 4/2020 | Kim | B60W 30/18036 |

* cited by examiner

METHOD AND APPARATUS THAT DIRECT LATERAL CONTROL DURING BACKWARD MOTION

The present application is related to U.S. application Ser. No. 15/044,851 filed on Feb. 16, 2016 entitled Preview Lateral Control for Automated Driving and U.S. application Ser. No. 15/621,242 filed on Jun. 13, 2017 entitled System and Method for Low Speed Lateral Control of a Vehicle.

INTRODUCTION

Apparatuses and methods consistent with exemplary embodiments relate to controlling vehicles. More particularly, apparatuses and methods consistent with exemplary embodiments relate to controlling vehicle during automated backward motion.

SUMMARY

One or more exemplary embodiments provide a method and an apparatus that control lateral movement of a vehicle during backward motion. In particular, one or more exemplary embodiments control lateral movement of an autonomous vehicle during backward movement by reflecting waypoints of a reverse or backward path over an axis that delineates forward and backward movement to generate a virtual forward path including the reflected waypoints. The lateral movement of the vehicle is then controlled by adjusting road wheel angle so as to the direct only the lateral movement of the vehicle toward the reflected waypoints of the virtual forward path.

According to an aspect of exemplary embodiment, a method that controls lateral movement of a vehicle during backward motion is provided. The method includes loading a desired backward path of vehicle, the backward path including waypoints to be traveled along during a rearward motion of the vehicle, reflecting the waypoints along a reflection axis perpendicular to a longitudinal axis that runs from front to back of the vehicle such that the reflected waypoints define virtual forward path, and controlling lateral movement of the vehicle to follow the waypoints along the virtual forward path while the vehicle is traveling in a backward direction.

The controlling lateral movement of the vehicle may include performing one-dimensional nonlinear optimization to determine a road wheel angle corresponding to the virtual forward path by minimizing lateral deviation of a center of gravity of the vehicle from the virtual forward path.

The may also include outputting the determined road wheel angle command to a front wheel actuator to turn the front wheel of the vehicle while the vehicle is traveling in the backward direction.

The outputting the determined road wheel angle command to the front wheel actuator may also include determining a current road wheel angle and outputting the road wheel angle command based on a difference between the current road wheel angle and the determined road wheel angle.

The controlling the lateral movement of the vehicle may include minimizing a cost function corresponding to a difference between waypoints representing the virtual forward path of the vehicle and a reflection of coordinates corresponding to an estimated position of the vehicle.

The determined road wheel angle command may be a product of a function of a speed of the vehicle and a road wheel angle which minimizes the cost function.

The method may also include detecting that the vehicle is in reverse mode and, in response to detecting the vehicle in reverse mode, loading the desired backward path of the vehicle.

The vehicle may include traveling in a backward direction at a speed below thirty-five miles per hour.

The reflection axis may intersect one from among a center of the vehicle, a center of gravity of the vehicle, front wheels of the vehicle or rear wheels of the vehicle.

According to an aspect of an exemplary embodiment, an apparatus that controls lateral movement of a vehicle during backward motion is provided. The apparatus includes: at least one memory comprising computer executable instructions; and at least one processor configured to read and execute the computer executable instructions. The computer executable instructions cause the at least one processor to load a desired backward path of vehicle, the backward path including waypoints to be traveled along during a rearward motion of the vehicle, reflect the waypoints along a reflection axis perpendicular to a longitudinal axis that runs from front to back of the vehicle such that the reflected waypoints define virtual forward path, and control lateral movement of the vehicle to follow the waypoints along the virtual forward path while the vehicle is traveling in a backward direction.

The computer executable instructions may cause the at least one processor to control the lateral movement of the vehicle by performing one-dimensional nonlinear optimization to determine a road wheel angle corresponding to the virtual forward path by minimizing lateral deviation of a center of gravity of the vehicle from the virtual forward path.

The computer executable instructions may cause the at least one processor to output the determined road wheel angle command to a front wheel actuator to turn the front wheel of the vehicle while the vehicle is traveling in the backward direction.

The computer executable instructions may cause the at least one processor to output the determined road wheel angle command to the front wheel actuator by determining a current road wheel angle and outputting the road wheel angle command based on a difference between the current road wheel angle and the determined road wheel angle.

The computer executable instructions may cause the at least one processor to control the lateral movement of the vehicle by minimizing a cost function corresponding to a difference between waypoints representing the virtual forward path of the vehicle and a reflection of coordinates corresponding to an estimated position of the vehicle.

The determined road wheel angle command may be a product of a function of a speed of the vehicle and a road wheel angle which minimizes the cost function.

The computer executable instructions may cause the at least one processor to detect that the vehicle is in reverse mode and, in response to detecting the vehicle in reverse mode, load the desired backward path of the vehicle.

The vehicle may be traveling in a backward direction at a speed below thirty-five miles per hour.

The reflection axis may intersect one from among a center of the vehicle, a center of gravity of the vehicle, front wheels of the vehicle or rear wheels of the vehicle. the axes are centered at one from among front wheels of the vehicle, rear wheels of the vehicle, and a center of gravity of the vehicle.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
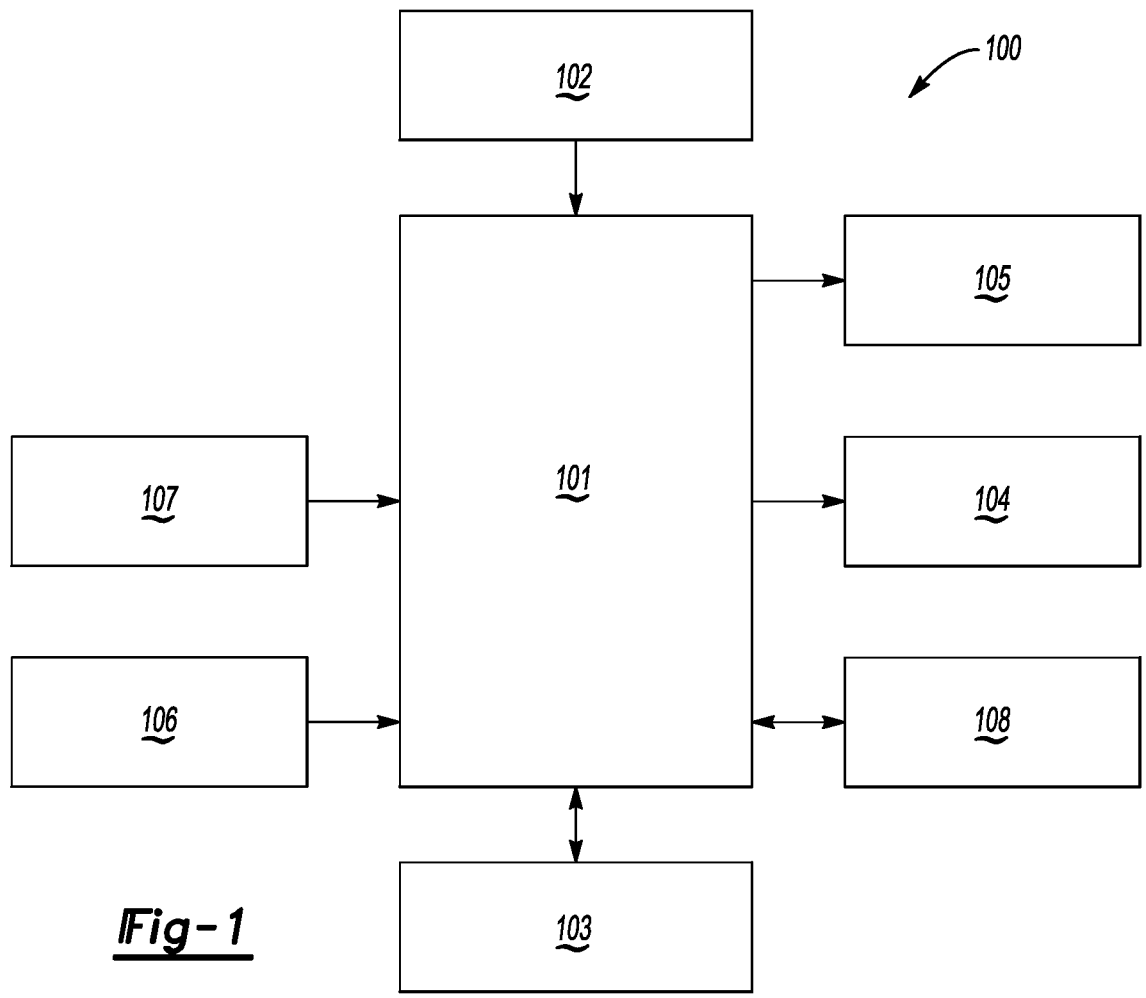
FIG. 1 shows a block diagram of an apparatus that controls lateral movement of the vehicle during backward motion according to an exemplary embodiment.

An apparatus and method that control lateral movement of the vehicle during backward motion will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are becoming increasingly automated and capable of performing maneuvers or driving themselves under controlled circumstances. A vehicle path including waypoints may define a desired path or maneuver and be used to control actuators to adjust the road wheel angle so that the path of travel of the vehicle is as close to the desired path as possible. However, backward paths and reverse maneuvers may be more complex and difficult to execute. Examples of backward paths and complex reverse maneuvers may include backing out of driveways onto streets, backing out in case of an unexpectedly closed road, or parallel, perpendicular and/or angled parking, with capability to react to dynamic obstacles behind the vehicle.

When controlling the vehicle to follow a backward path via reverse motion, the complexities arise because the system will have a greater phase contribution, e.g., vehicle moves away from the path before it moves closer to the path. Thus, a control system to address this complexity may help simplify vehicle maneuvering and more closely follow a backward path for reverse motion speeds under 35 miles per hour.

FIG. 1 shows a block diagram of an apparatus that controls lateral movement of the vehicle during backward motion 100 according to an exemplary embodiment. As shown in FIG. 1, the apparatus that controls lateral movement of the vehicle during backward motion 100, according to an exemplary embodiment, includes a controller 101, a power supply 102, a storage 103, an output 104, vehicle settings and controls 105, a user input 106, a sensor 107 and a communication device 108. However, the apparatus that controls lateral movement of the vehicle during backward motion 100 is not limited to the aforementioned configuration and may be configured to include additional elements and/or omit one or more of the aforementioned elements. The apparatus that controls lateral movement of the vehicle during backward motion 100 may be implemented as part of a vehicle, as a standalone component, as a hybrid between an on vehicle and off vehicle device, or in another computing device.

The controller 101 controls the overall operation and function of the apparatus that controls lateral movement of the vehicle during backward motion 100. The controller 101 may control one or more of a storage 103, an output 104, vehicle settings and controls 105, a user input 106, a sensor 107 and a communication device 108 of the apparatus that controls lateral movement of the vehicle during backward motion 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle settings and controls 105, the user input 106, the sensor 107 and the communication device 108 of the apparatus that controls lateral movement of the vehicle during backward motion 100. The information may be sent and received via a bus or network, or may be directly read or written to/from one or more of the storage 103, the output 104, the vehicle settings and controls 105, the user input 106, the sensor 107 and the communication device 108 of the apparatus that controls lateral movement of the vehicle during backward motion 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle settings and controls 105, the user input 106, the sensor 107 and the communication device 108, of the apparatus that controls lateral movement of the vehicle during backward motion 100. The power supply 102 may include one or more from among a battery, an outlet, a capacitor, a solar energy cell, a generator, a wind energy device, an alternator, etc.

The storage 103 is configured for storing information and retrieving information used by the apparatus that controls lateral movement of the vehicle during backward motion 100. The storage 103 may be controlled by the controller 101 to store and retrieve information including desired path information, virtual forward path information, road wheel angle information, vehicle dynamics information, and estimated position information. The information may be collected and received the from user input 106, the communication device 108 or from one or more of the sensors 107. The storage 103 may also include the computer instructions configured to be executed by a processor to perform the functions of the apparatus that controls lateral movement of the vehicle during backward motion 100.

The path information may include waypoints including an x coordinate and a y coordinate. The x coordinate is a coordinate with respect to an axis that runs longitudinally (i.e. front to back of the vehicle) through a center of a vehicle or center of mass of the vehicle. The y coordinate is a coordinate with respect to an axis that runs perpendicular to the longitudinal axis thorough a center of the vehicle or the center of center of mass of the vehicle. The center or center of mass of the vehicle are only examples of where the axes may intersect and the axes may be centered at the front wheel or rear wheels of the vehicle. The waypoints may make up a forward path or a backward path.

The road wheel angle information may include the angle of the wheels and/or direction of travel of the vehicle. The estimated position information may include the present location of the vehicle (e.g., the center of gravity of the vehicle, the center of the vehicle, the front wheels of the vehicle or the rear wheels of the vehicle) or predicted or estimated position, and may include GPS coordinates and/or offset information. The road wheel angle information may be provided by sensors 107 or reading information provided by the vehicle settings and controls 105.

The vehicle dynamics information may include one or more from among lateral acceleration, longitudinal acceleration, speed information, steering angle information, or road wheel angle information. The vehicle dynamics information may be provided by sensors 107 or reading information provided by the vehicle settings and controls 105.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that controls lateral movement of the vehicle during backward motion 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of a value of a vehicle setting or notifying that a vehicle setting is being adjusted. In addition, the output 104 may display a message for a person at an appropriate location in the vehicle.

The vehicle settings and controls 105 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions.

As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM may be electronic power steering module that controls steering angle, another VSM can be a powertrain control module that regulates operation of one or more components of the vehicle powertrain, another VSM can be the vehicle dynamics sensor that detects a steering wheel angle parameter, a speed parameter, an acceleration parameter, a lateral acceleration parameter, and/or a road wheel angle parameter, and another VSM can be a body control module that governs various electrical components located throughout the vehicle, like the vehicle's power door locks and headlights. As is appreciated by those skilled in the art, the above-mentioned VSMs are only examples of some of the modules that may be used in a vehicle, as numerous others are also available.

The user input 106 is configured to provide information and commands to the apparatus that controls lateral movement of the vehicle during backward motion 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc.

The user input 106 may be configured to receive a user input to acknowledge or dismiss the notification output by the output 104. The user input 106 may also be configured to receive a user input to adjust a vehicle setting. The adjusted vehicle setting may then be stored in storage 103.

The sensor 107 may include one or more sensors from a camera, an infrared thermal camera, an accelerometer, a barometer, an elevation sensor, a light sensor, an altimeter, a speedometer, a gyroscope, and a braking pressure sensor. In one example, the camera may be one or more from among an in-vehicle camera, an infrared camera, and a mobile device camera.

The communication device 108 may be used by apparatus that controls lateral movement of the vehicle during backward motion 100 to communicate with several types of external apparatuses according to various communication methods. The communication device 108 may be used to send/receive information from a mobile device. The communication device 108 may send information and notifications to be output by the mobile device by an output at the mobile device that performs functions similar to output 104.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from GPS satellites and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that controls lateral movement of the vehicle during backward motion 100 may be configured to load a desired backward path of vehicle, the backward path including waypoints to be traveled along during a rearward motion of the vehicle, reflect the waypoints along a reflection axis perpendicular to a longitudinal axis that runs from front to back of the vehicle such that the reflected waypoints define virtual forward path, and control lateral movement of the vehicle to follow the waypoints along the virtual forward path while the vehicle is traveling in a backward direction.

The controller 101 may load the desired backward path of the vehicle in response to detecting that the vehicle is in reverse mode. The vehicle may travel in a backward direction at a speed below thirty-five miles per hour. The reflection axis may intersect a center of the vehicle, a center of gravity of the vehicle, front wheels of the vehicle or rear wheels of the vehicle. The longitudinal and reflection axes may be centered at one from among front wheels of the vehicle, rear wheels of the vehicle, and a center of gravity of the vehicle.

In addition, the controller 101 of the apparatus that controls lateral movement of the vehicle during backward motion 100 may also be configured to control the lateral movement of the vehicle by performing one-dimensional nonlinear optimization to determine a road wheel angle corresponding to the virtual forward path by minimizing lateral deviation of a center of gravity of the vehicle from the virtual forward path.

Further, the controller 101 of the apparatus that controls lateral movement of the vehicle during backward motion 100 may be configured to output the determined road wheel angle command to a front wheel actuator to turn the front wheel of the vehicle while the vehicle is traveling in the backward direction.

In addition, the controller 101 of the apparatus that controls lateral movement of the vehicle during backward motion 100 may be configured to control to output the determined road wheel angle command to a front wheel actuator to turn the front wheel of the vehicle while the vehicle is traveling in the backward direction.

The controller 101 may control to output the determined road wheel angle command to the front wheel actuator by determining a current road wheel angle and outputting the road wheel angle command based on a difference between the current road wheel angle and the determined road wheel angle. The determined road wheel angle command may be a product of a function of a speed of the vehicle and the minimized cost function.

The controller 101 may control the lateral movement of the vehicle by minimizing a cost function corresponding to a difference between waypoints representing the virtual forward path of the vehicle and a reflection of coordinates corresponding to an estimated position of the vehicle.

Figure 2:
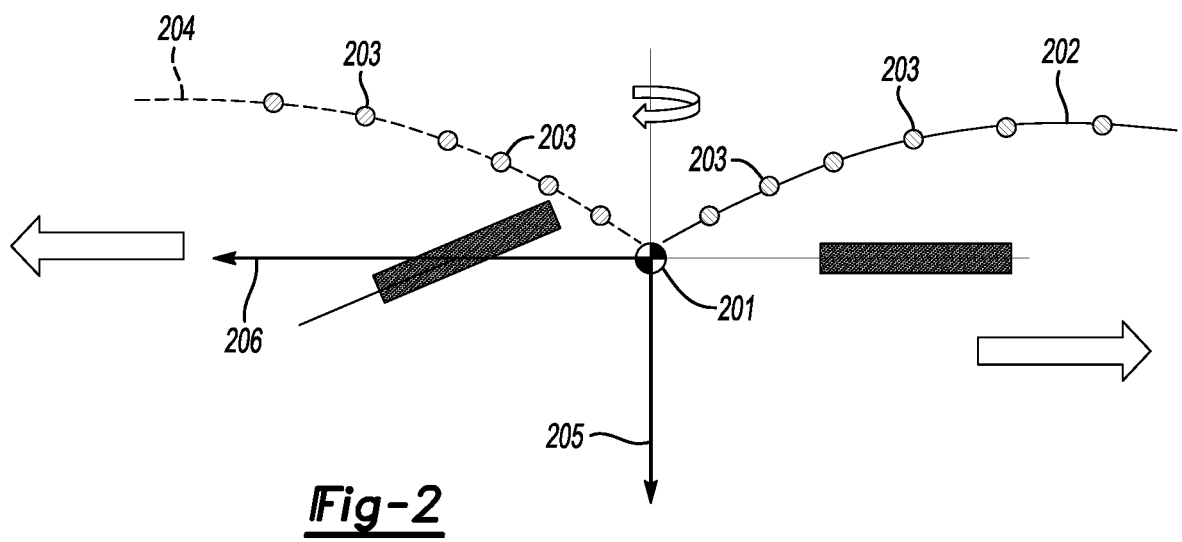
FIG. 2 shows an illustrative diagram of a reflected path used to control lateral movement of the vehicle during backward motion according to an aspect of an exemplary embodiment.

FIG. 2 shows an illustrative diagram of a reflected path used to control lateral movement of the vehicle during backward motion according to an aspect of an exemplary embodiment. Referring to FIG. 2, a vehicle 201 is intends to travel along a desired path 202 made up of waypoints 203. The waypoints 203 may include x, y coordinates, where the x coordinate represents a location on a longitudinal axis that runs from front to back of a vehicle and the y coordinate represents a location on an axis 205 perpendicular to the longitudinal axis 206 of the vehicle. The longitudinal and perpendicular axes may be centered at the front wheels, the rear wheels, center or the center of gravity of the vehicle.

The road wheel angle or lateral movement of the vehicle needs to be controlled to direct the lateral movement of vehicle 201 towards waypoints 203 along desired path 202. To reduce the complexity of this process, the waypoints of desired path 202 are reflected across axis 205 to create an imaginary reflected virtual forward path 204. The road wheel angle or lateral movement of the vehicle is controlled so as to follow the reflected virtual forward path 204 while the vehicle is traveling backwards.

In other words, the estimated actual or current position of the vehicle is captured as the vehicle is traveling in reverse and the estimated actual or current position is then reflected over the axis perpendicular to the longitudinal axis of the vehicle. The reflected estimated current position is then used to adjust the lateral movement or road wheel angle of the vehicle to direct the vehicle towards the next waypoint on the virtual forward path 204. However, the vehicle continues its motion in reverse or backwards.

Figure 3:
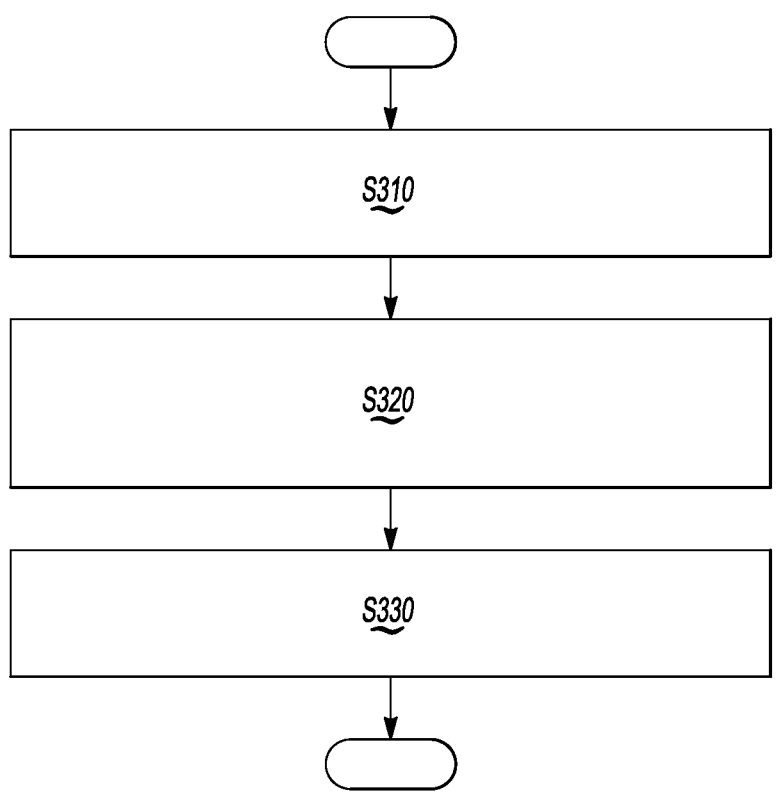
FIG. 3 shows a flowchart for a method that controls lateral movement of the vehicle during backward motion according to an exemplary embodiment.

FIG. 3 shows a flowchart for a method that controls lateral movement of a vehicle during backward motion according to an exemplary embodiment. The method of FIG. 3 may be performed by the apparatus that controls lateral movement of the vehicle during backward motion 100 or may be encoded into a computer readable medium as instructions that are executable by a computer to perform the method.

Referring to FIG. 3, a desired backward path of the vehicle including waypoints to be traveled along during backward motion of the vehicle is loaded in operation S310. In operation S320, the waypoints are reflected along an axis perpendicular to a longitudinal axis that runs from to back of the vehicle, the waypoints reflected waypoints defining a virtual forward path. The longitudinal and perpendicular axes may be centered at the front wheels, the rear wheels, center or the center of gravity of the vehicle.

The lateral movement of the vehicle is controlled in operation S330 to follow waypoints along forward path while vehicle is traveling backward. In one example, the lateral movement may be controlled by outputting the determined road wheel angle command to a front wheel actuator by determining a current road wheel angle and outputting the road wheel angle command based on a difference between the current road wheel angle and a determined or target road wheel angle.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method that controls lateral movement of a vehicle during backward motion, the method comprising:
    loading a desired backward path of the vehicle, the backward path comprising waypoints to be traveled along during a rearward motion of the vehicle;
    reflecting the waypoints along a reflection axis perpendicular to a longitudinal axis that runs from front to back of the vehicle such that the reflected waypoints define a virtual forward path; and
    controlling lateral movement of the vehicle to follow the waypoints along the virtual forward path while the vehicle is traveling in a backward direction, including performing one-dimensional nonlinear optimization to determine a road wheel angle corresponding to the virtual forward path by minimizing a lateral deviation of a center of gravity of the vehicle from the virtual forward path;
    wherein the lateral movement of the vehicle is controlled based upon a difference between the waypoints of the virtual forward path of the vehicle and a reflection of coordinates corresponding to an estimated position of the vehicle, wherein the estimated position of the vehicle is determined based upon GPS coordinates of the vehicle.

2. The method of claim 1, further comprising outputting the determined road wheel angle command to a front wheel actuator to turn the front wheel of the vehicle while the vehicle is traveling in the backward direction.

3. The method of claim 2, wherein the outputting the determined road wheel angle command to the front wheel actuator comprises determining a current road wheel angle and outputting the road wheel angle command based on a difference between the current road wheel angle and the determined road wheel angle.

4. The method of claim 3, wherein the controlling the lateral movement of the vehicle comprises minimizing a cost function corresponding to the difference between the waypoints representing the virtual forward path of the vehicle and a reflection of coordinates corresponding to the estimated position of the vehicle.

5. The method of claim 4, wherein the determined road wheel angle command is a product of a function of a speed of the vehicle and a road wheel angle which minimizes the cost function.

6. The method of claim 1, further comprising detecting that the vehicle is in reverse mode and, in response to detecting the vehicle in reverse mode, loading the desired backward path of the vehicle.

7. The method of claim 1, wherein the vehicle is traveling in a backward direction at a speed below thirty-five miles per hour.

8. The method of claim 1, wherein the reflection axis intersects a center of the vehicle, a center of gravity of the vehicle, front wheels of the vehicle or rear wheels of the vehicle.

9. A non-transitory computer readable medium comprising instructions executable to perform the method of claim 1.

10. An apparatus that controls lateral movement of a vehicle during backward motion, the apparatus comprising:
    at least one memory comprising computer executable instructions; and
    at least one processor configured to read and execute the computer executable instructions, the computer executable instructions causing the at least one processor to:
    load a desired backward path of the vehicle, the backward path comprising waypoints to be traveled along during a rearward motion of the vehicle;
    reflect the waypoints along a reflection axis perpendicular to a longitudinal axis that runs from front to back of the vehicle such that the reflected waypoints define virtual forward path; and
    control lateral movement of the vehicle to follow the waypoints along the virtual forward path while the vehicle is traveling in a backward direction, including performing one-dimensional nonlinear optimization to determine a road wheel angle corresponding to the virtual forward path by minimizing a lateral deviation of a center of gravity of the vehicle from the virtual forward path;
    wherein the lateral movement of the vehicle is controlled based upon a difference between waypoints representing the virtual forward path of the vehicle and a reflection of coordinates corresponding to an estimated position of the vehicle, wherein the estimated position of the vehicle is determined based upon GPS coordinates of the vehicle.

11. The apparatus of claim 10, wherein the computer executable instructions cause the at least one processor to output the determined road wheel angle command to a front wheel actuator to turn the front wheel of the vehicle while the vehicle is traveling in the backward direction.

12. The apparatus of claim 11, wherein the computer executable instructions cause the at least one processor to output the determined road wheel angle command to the front wheel actuator by determining a current road wheel angle and outputting the road wheel angle command based on a difference between the current road wheel angle and the determined road wheel angle.

13. The apparatus of claim 12, wherein the computer executable instructions cause the at least one processor to control the lateral movement of the vehicle by minimizing a cost function corresponding to the difference between waypoints representing the virtual forward path of the vehicle and a reflection of coordinates corresponding to an estimated position of the vehicle.

14. The apparatus of claim 13, wherein the determined road wheel angle command is a product of a function of a speed of the vehicle and a road wheel angle which minimizes the cost function.

15. The apparatus of claim 10, wherein the computer executable instructions cause the at least one processor to detect that the vehicle is in reverse mode and, in response to detecting the vehicle in reverse mode, load the desired backward path of the vehicle.

16. The apparatus of claim 10, wherein the vehicle is traveling in a backward direction at a speed below thirty-five miles per hour.

17. The apparatus of claim 10, wherein the reflection axis intersects a center of the vehicle, a center of gravity of the vehicle, front wheels of the vehicle or rear wheels of the vehicle.

18. The apparatus of claim 10, wherein the axes are centered at one from among front wheels of the vehicle, rear wheels of the vehicle, and a center of gravity of the vehicle.

\* \* \* \* \*